United States Patent
Rice

(10) Patent No.: US 11,261,851 B1
(45) Date of Patent: Mar. 1, 2022

(54) GRAVITY ASSISTED MECHANICAL ENERGY

(71) Applicant: Michael Arthur Rice, Oldsmar, FL (US)

(72) Inventor: Michael Arthur Rice, Oldsmar, FL (US)

( * ) Notice: Subject to any disclaimer, the term of this patent is extended or adjusted under 35 U.S.C. 154(b) by 186 days.

(21) Appl. No.: 16/870,811

(22) Filed: May 8, 2020

Related U.S. Application Data

(63) Continuation-in-part of application No. 15/825,379, filed on Nov. 29, 2017, now abandoned.

(51) Int. Cl.
| | | |
|---|---|---|
| *F03G 3/08* | (2006.01) | |
| *F03G 5/06* | (2006.01) | |
| *H02J 7/14* | (2006.01) | |
| *F16H 7/02* | (2006.01) | |
| *F16H 21/44* | (2006.01) | |
| *H02K 7/02* | (2006.01) | |
| *H02K 7/18* | (2006.01) | |
| *F03G 3/00* | (2006.01) | |

(52) U.S. Cl.
CPC ............. *F03G 3/08* (2013.01); *F03G 3/00* (2013.01); *F03G 5/06* (2013.01); *F03G 5/062* (2021.08); *F03G 5/065* (2021.08); *F16H 7/02* (2013.01); *F16H 21/44* (2013.01); *H02J 7/14* (2013.01); *H02K 7/025* (2013.01); *H02K 7/1876* (2013.01)

(58) Field of Classification Search
CPC ... F03G 3/00; F03G 3/08; F03G 3/087; F03G 5/06; F03G 5/062; F03G 5/063; F03G 5/065; F03G 7/10; F03G 7/104; F03G 7/107; F03G 7/115
See application file for complete search history.

(56) References Cited

U.S. PATENT DOCUMENTS

| | | | | |
|---|---|---|---|---|
| 2009/0051169 A1* | 2/2009 | Kostoff | ............... | H02K 7/1815 290/1 R |
| 2013/0315715 A1* | 11/2013 | Tsai | ............... | F01D 23/00 415/124.1 |
| 2020/0049132 A1* | 2/2020 | Traner | ............... | F03G 7/10 |

* cited by examiner

*Primary Examiner* — Daniel J Colilla

(57) ABSTRACT

(1) Gravity assisted mechanical machine that uses a combination of stored mechanical energy plus the downward force of gravity, regulated by a motor and a sophisticated switch powered by a rechargeable battery. The mechanical switch is also assisted by a lever so the motor is more efficient in the use of the battery power.
(2) Older types of fuel powered mechanical machines cause greater pollution and need an enormous amount of support to continue operating daily.
(3) The gravity assisted mechanical machine can be used without air and operates longer and more efficiently and is less noisy and has no emissions to cause pollution. It will not heat up like a conventional mechanical machine only when attached to a generator for electrical energy. It will work without the need for the enormous weight of fuel to produce electrical energy.
It can be used to power some electrical generators, example wind mill generators, for all uses of electrical energy.

10 Claims, 4 Drawing Sheets

GRAVITY ASSISTED MECHANICAL ENERGY

This application is a CIP of Ser. No. 15/825,379, filed Nov. 29, 2017 by the present inventor.

1. TECHNICAL FIELD

The present invention relates to a mechanical machine, and more specifically to an energy efficient drive for a mechanical electrical generator.

2. BACKGROUND

The basic background of older mechanical drives is pollution and wasted energy plus the enormous amount of weight needed to be transported to make the older inefficient mechanical drives function.

3. SUMMARY OF EMBODIMENTS

The embodiment uses partial gravity to charge up a battery that is charged by a generator or solar panel and can be operated by hand using the lever (illustrated in FIG. 2). The heaver the slider bar (FIG. 1—ref #116) of the embodiment the greater the force exerted for producing mechanical energy when the slider bar completes a half turn it is thrusted upward through the embodiment to be above and off center to let gravity pull the slider bar down to repeat the cycle. This is done by multiple springs attached to (FIG. 1—ref #T or M thruster parts) to move the slider bar up and off center. The embodiment is also made so the (FIG. 1—ref #125, 129 T or M springs) and (FIG. 1—ref #140,142 switch pins A, B) are easily accessible on the outside edges and surface to maintain easily. A lever, switch and motor regulate the cycle of the embodiment, the motor is powered by a rechargeable battery. The embodiment can be attached to a flywheel, gear system on an electrical generator thus being more efficient at charging a battery. This embodiment can be used to power each dwelling more efficiently with no harmful side effects or emissions and work independently or with current electrical grids resulting in less power outages after a storm. It can be used as a science toy to teach the effects of gravity. Advantages it can be used with no air by using a large battery and known devices to regulate its speed. The embodiment can be attached to a wind turbine to produce electricity without the wind. Thus some embodiments provide a mechanical drive that is lighter and quieter than standard mechanical drives. Some embodiments provide a mechanical drive that is less expensive and more efficient than standard mechanical drives. These and other benefits of one or more aspects will become apparent for a consideration of the ensuing description and accompanying drawings.

4. BRIEF DESCRIPTION OF DRAWINGS

The current embodiment (FIG. 1) can be made of many materials wood, metal, plastic. It can be made of round, square, rectangle or other shapes and work the same. The embodiment can be made large or small, it is a gravity assisted means for mechanical energy. The drawings show a detail construction of (FIG. 1) and the supporting devices or mechanisms that keep it functioning. The current embodiment (FIG. 1) is an exploded view of a detail construction of a widget that moves a slider bar from left to right moving the slider bar off center. This upward off center movement is repeated from left to right to produce mechanical energy.

FIG. 2 is a landscape view of the complete function of the embodiment with a table included to better understand FIG. 2. From right to left the part name is called the mechanical switch, it rotates to push the lever down until it is released to activate FIG. 1 to make the invention function. The mechanical switch is powered by a battery and turned by a motor and can be hand operated or powered by any source to keep the battery charged, Ex. Solar. FIG. 1 when activated it is above and off center and begins to rotate and turn a flywheel to about 50 rpms.

FIG. 3 is the flywheel attached to an axis that is mounted through a sheet of plywood. There is a pillow block bearing to let the flywheel rotate freely from the axel when turned by FIG. 1's rotation.

FIG. 4 is the axis where figure one is mounted on one side and the flywheel on the other side.

FIG. 5 is a stopping point for FIG. 1 to operate. It is a catch and release mechanism operated by movable parts electrically powered by a battery and solenoid.

FIG. 6 is a pillow block flange bearing for the flywheel mounted in the center.

FIG. 7 is the part that FIG. 1 mounts to and is mounted on the axel the holes in the center at the top and bottom have quarter twenty bolts that are used to stop the rotation for switching FIG. 1 up and off center.

Figure 1:
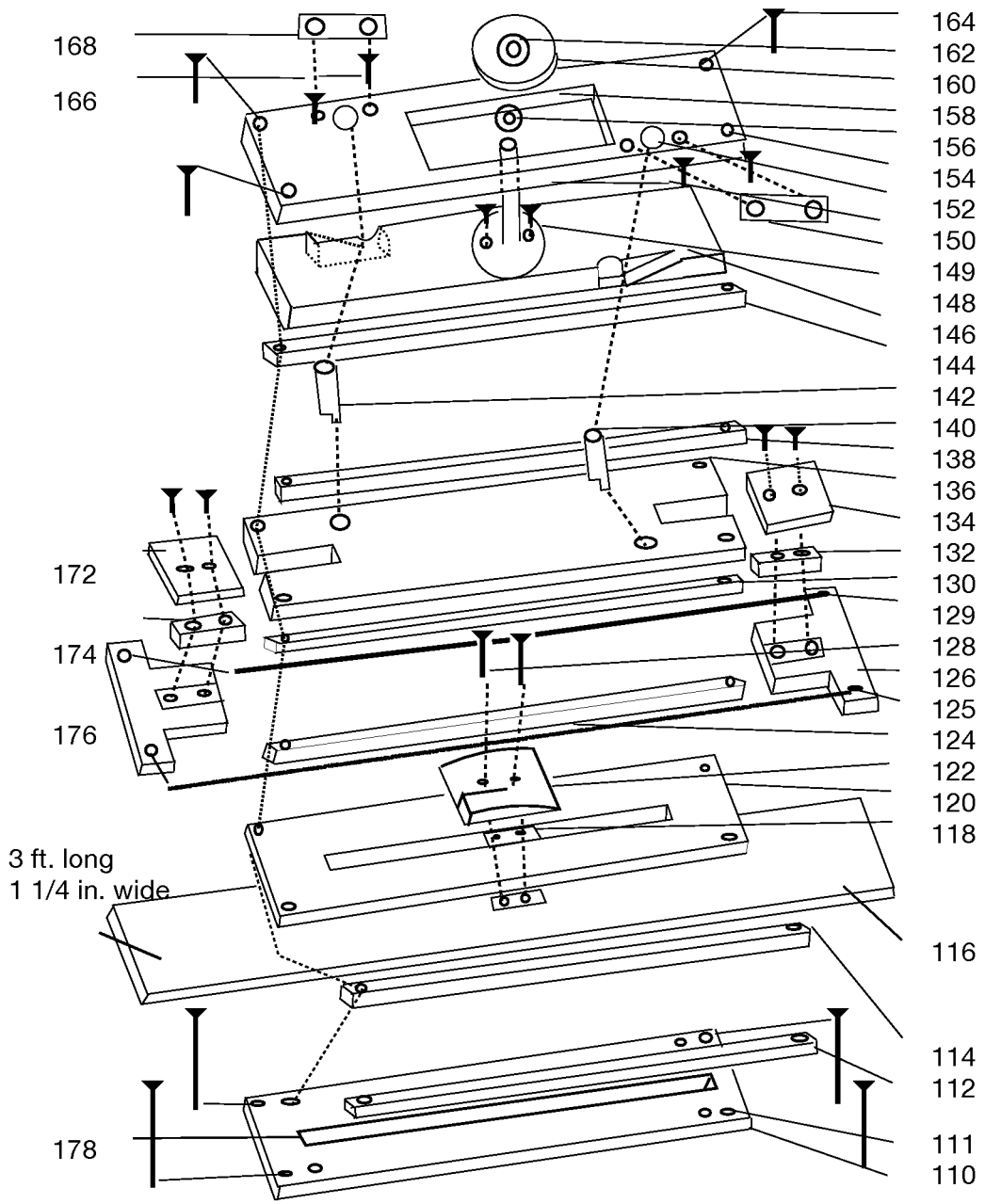
Figure 2A:
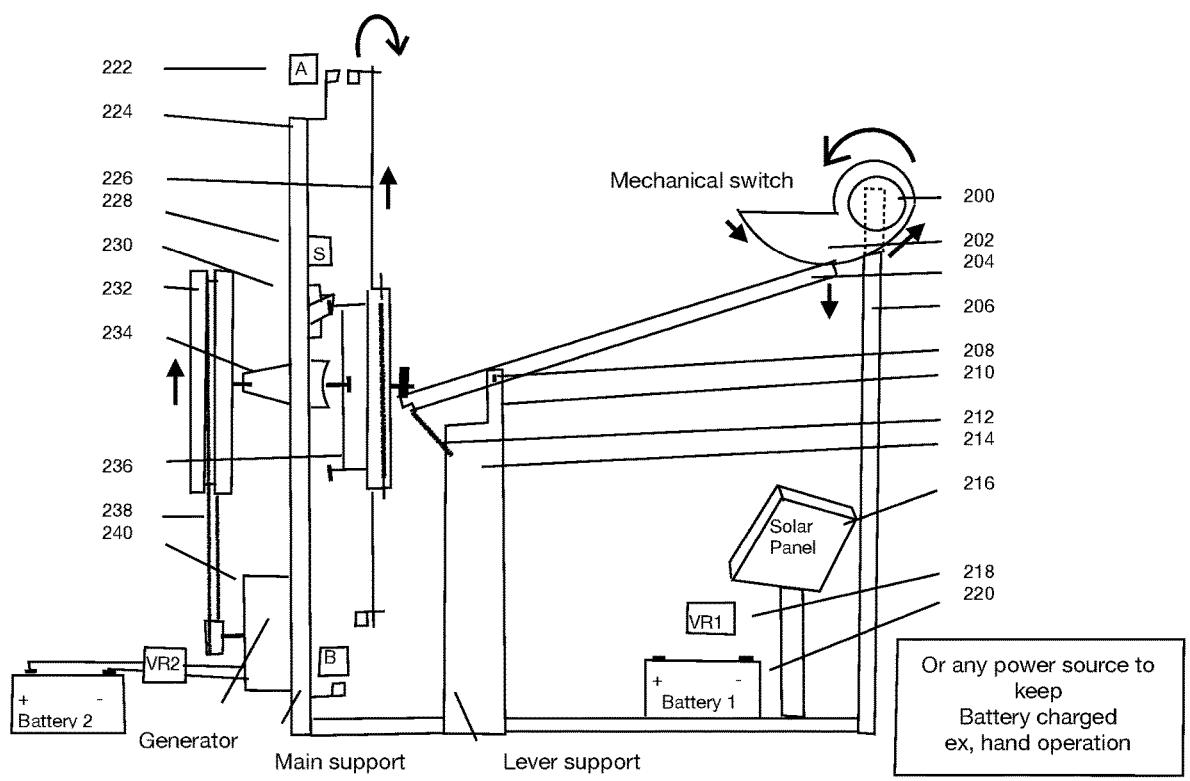
Figure 2B:
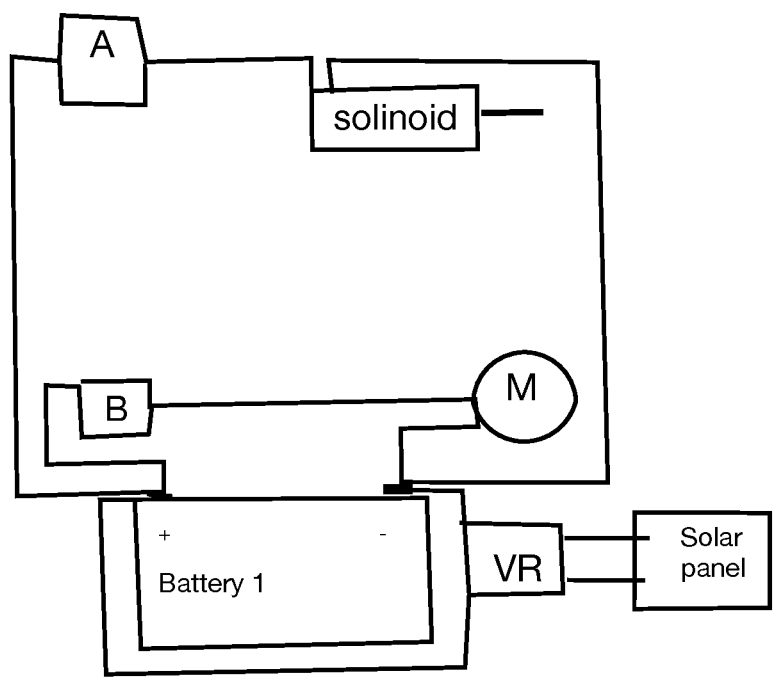
Figure 2C:
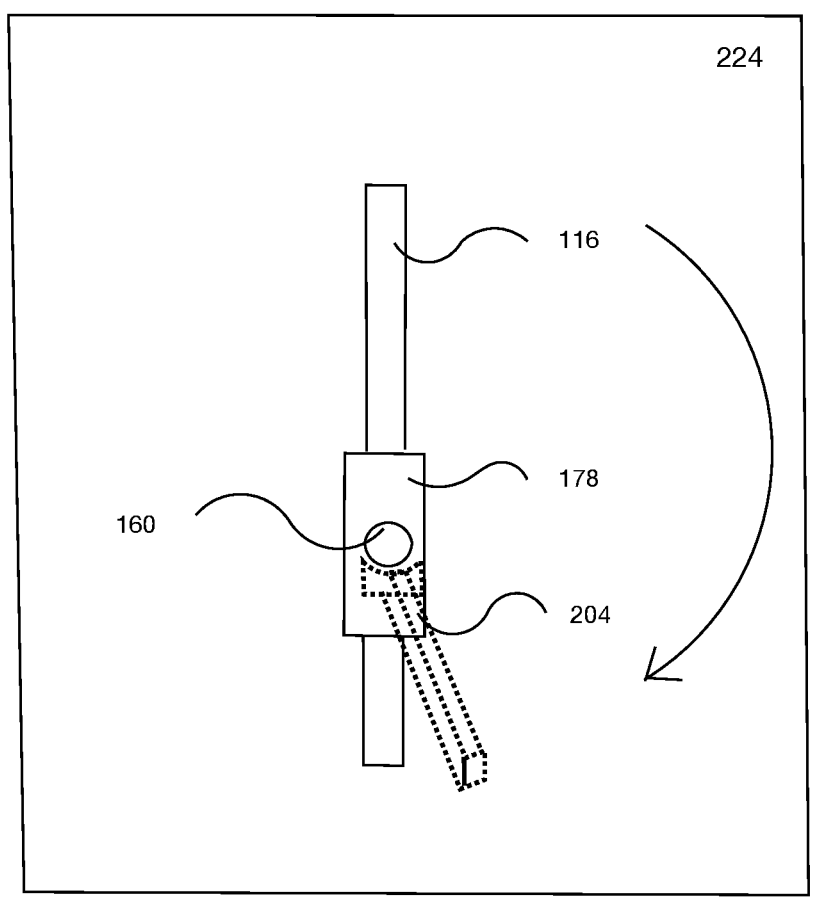

FIG. 8 is illustrated in FIG. 2 named Mechanical Switch and attached to a motor powered by a battery. FIG. 8 clears the lever and lets the lever clear FIG. 1 so rotation is achieved. FIG. 8 can be moved so the lever can be hand operated.

5. DETAILED DESCRIPTION

FIG. 2 shows an overall view of the machine that is powered by Battery #1 (part #220) that is kept charged by a solar panel (part #216) attached to a voltage regulator (part #218) or charged by any source and can be hand operated. From right to left the motor (part #200) connected to the mechanical switch (part #202) whereby the motor is attached to support (part #206). Activated by the switching diagram, by attaching electrical wires, Switch A (part #222) is a magnetic reed switch that is closed and open by the movement of FIG. 1, also Switch B (part #242) is a magnetic reed switch that is closed and open by the movement of FIG. 1. The Mechanical Switch (part #202) movement is for the lever (part #204) that activates the upward movement of FIG. 1. The lever (part #204) is fastened by (part #208) attached to a U bracket (part #210) with two springs (part #212) fastened to the left side of the lever (part #204). The U bracket is attached to the lever support (part #214). All connected to a base for steading supports. FIG. 2's main support is a sheet of ¾ inch thick plywood (part #224) for fastening the reed switches (part #222 and #242) and other parts. The axel (part #234) holds FIG. 1's mounting bracket (part #236) on the right side of the plywood and is stopped by (part #230) with ¼ twenty nuts and bolts at the top center and bottom center of (part #236) then the solenoid is closed by the circuit to release figure one. The left side of the axel supports the flywheel that is bolted on to the axel (part #232). Then a belt (part #238) connects the flywheel to a generator with low or no resistance, example a wind generator (part #240). The voltage regulator (part #242) is connected to Battery 2 (part #244).

FIG. 1 has some modified parts they are (part #122) and (part #110), plus (parts 172,174,176) and the use of different springs (part #125). Two kinds of extension springs by Hillman springs, are at safe working loads of (2.1 lbs and 1.03 lbs.

FIG. 3 is a flywheel made with a combination of wood and metal.

FIG. 4 is a spindle assembly (Stens 285-585 Spindle Assembly).

FIG. 5 is a mechanical switch that stops FIG. 1 to repeat the rotation on the left the wedge stops figure one then the solenoid is activated and figure one is released to repeat the rotational cycle. From right to left the solenoid is connected to a loop in a piece of metal that is threaded through two eyelet screws connected to a piece of wood cut to fit under a lever wedge to the left, that is supported by one large rectangular piece of wood and the movable wedge on left is held in place by two small rectangular pieces of wood held in by a metal pin. All parts are screwed to the right side of the sheet of plywood as illustrated in FIG. 2.

FIG. 6 is a ⅝ inch 4 bolt pillow block flange bearing, UCF202-10, Self-Alignment connected to the flywheel.

FIG. 7 is (part #236) as shown in FIG. 2. Two ¼-20 mushroom head bolts stainless steel are bolted in the center at the top and bottom of (part #236). The four corner holes are for ⁵⁄₃₂ Stainless steel bolt and nuts to fasten FIG. 1. The center is cut to fit the factory design of the spindle assembly.

FIG. 8 is a mechanical switch that resembles the golden ratio that is made of a piece of wood connected to a motor that activates the lever downward as described in the first part of the detail description on page 3.

Screws, bolts and nuts are used to secure wooden and metal parts.

| Drawing Reference numerals FIG. #2 |
|---|
| 200 Motor |
| 202 Mechanic & switch |
| 204 Lever |
| 206 mechanical switch and motor stand |
| 208 Bolt for lever |
| 210 U bracket for bolt and lever |
| 212 Springs for lever |
| 214 Lever support stand |
| 216 Solar Panel |
| 218 Voltage Regulator 1 |
| 220 Battery 1 |
| 222 A- Magnetic reed switch |
| 224 Plywood to hold parts |
| 226 FIG. #1 |
| 228 Solenoid release switch |
| 230 Break and release switch |
| 232 Flywheel |
| 234 Bering axel |
| 236 Mounting bracket for FIG. #1 |
| 238 Drive belt for generator |
| 240 Generator AC three phase or Single or DC |
| 242 Battery 2 |
| 244 B- Magnetic reed switch |
| 246 Voltage Regulator 2 |

| Drawing Reference Numerals FIG. #1 |
|---|
| 110 Bottom Cover |
| 111 Bottom Mounting Bolts |
| 112 Slider Rail A |
| 114 Slider Rail B |
| 116 Slider bar |
| 118 Slider Guide spacer |
| 120 Slider Guide |
| 122 Slider Guide thruster |
| 124 Thruster Rail A |

| Drawing Reference Numerals FIG. #1 -continued |
|---|
| 125 Spring Hole and T spring A |
| 126 T Plate Thruster A |
| 128 Screws for Slider Guide Thruster |
| 129 Spring Hole and T Spring B |
| 130 Thruster Rail B |
| 132 T Plate Thruster Spacer A |
| 134 T Plate Slider Switch A |
| 136 T Plate Guide |
| 138 Switch Rail A |
| 140 Switch Pin (Catch Release) A |
| 142 Switch Pin (Catch Release) B |
| 144 Switch Rail B |
| 145 Switch end spacer (1 bar) B |
| 146 Switch Plate |
| 148 Pulley Bolt |
| 149 Switch Pin Elastic Cover |
| 150 Top Plate (Switch Cover) |
| 152 Switch Pin Holes (qty 4) |
| 154 Bolt Holes |
| 156 Pulley Bottom Nut |
| 158 Switch Plate Slide Hole |
| 160 Pulley |
| 162 Pulley Top Nut |
| 164 Bolts (qty 4) Fastening |
| 166 Spring Bolt (qty 4) Hold Switch Pin #140,142 |
| 168 Switch Pin Elastic Cover |
| 170 Switch end spacer (1 bar) A |
| 172 T Plate slider switch B |
| 174 T Plate Thruster Spacer B |
| 176 T Plate Thruster B |

| Drawing reference numerals FIG. #3 |
|---|
| 301 round plywood ½ inch thick |
| 303 smaller round plywood 5/8 inch |
| 305 round plywood ½ inch thick |
| 307 triangle wood |
| 309 long triangle wood flapper |
| 311 Metal bar 2 by 11 inches ⅛ thick |
| 313 ⅝ inch pillow block flange bering |
| 315 (FIG. #4) Spindle Assembly |
| 317 long triangle wood flapper |
| 319 ¼-20 bolt fasten wood flapper |
| 321 -(224 same as) Plywood to hold parts |

The invention claimed is:

1. A machine comprising:
   a pivotably supported lever having a first end and a second end;
   a slidable elongated core rotatably mounted to an upright wall, wherein said slidable elongated core includes:
      a first spring;
      a second spring;
      a first catch mechanism; and
      a second catch mechanism;
      a reciprocating slider bar disposed for linear, reciprocating movement within the slidable elongated core, said reciprocating slider bar having a first end and a second end,
   wherein said reciprocating slider bar is configured to be locked in a first position relative to the slidable elongated core via said first catch mechanism and is configured to be locked in a second position relative to the slidable elongated core via a second catch mechanism,
   wherein said first end of said lever is configured to linearly move said slidable elongated core;

whereby, when the first end of said lever linearly moves said slidable elongated core, the machine is configured to operate in a first cycle, wherein:

said first end of said lever linearly moves said slidable elongated core;

which causes said first catch mechanism to be released;

which causes said second spring to release stored energy thereby causing said reciprocating slider bar to move linearly in a substantially vertical first direction to a first position in which said first end of said reciprocating slider bar extends a greater vertical distance from the slidable elongated core than said second end of said reciprocating slider bar;

which causes said first spring to be compressed, thereby storing mechanical energy; and thereafter, said second catch mechanism locks said reciprocating slider bar from movement with respect to the slidable elongated core, whereby the reciprocating slider bar is disposed in said slidable elongated core such that when said first end of said reciprocating slider bar is in said first position, gravity pulls said first end of said reciprocating slider bar downward thereby causing said reciprocating slider bar and said slidable elongated core to rotate in a rotational direction until the first end of said reciprocating slider bar reaches a second position which is located substantially at the bottom of the rotation of the reciprocating slider bar, wherein when said first end of said reciprocating slider bar is at the second position and said first end of said lever linearly moves said slidable elongated core again, the machine is configured to operate in a second cycle, wherein:

said second catch mechanism is released;

said first spring releases stored energy which causes said reciprocating slider bar to move linearly in a substantially vertical first direction to a second position in which said second end of said reciprocating slider bar extends a greater vertical distance from the slidable elongated core than said first end of said reciprocating slider bar;

which causes said second spring to be compressed, thereby storing mechanical energy; and thereafter, said first catch mechanism locks said reciprocating slider bar from movement with respect to the slidable elongated core;

whereby when said second end of said reciprocating slider bar is in said first position, gravity pulls said second end of said reciprocating slider bar downward thereby causing said reciprocating slider bar and said slidable elongated core to rotate in said rotational direction until the second end of said reciprocating slider bar reaches said second position, wherein the machine is configured to repeat said first and second cycles for as long as the first end of the lever is operated to move the slidable elongated core.

2. The machine according to claim 1, further comprising:
a rotation axle;
a flywheel;
a generator;
a conductor; and
a first battery,
wherein a first end of said rotation axle rotatably supports the slidable elongated core on said upright wall, and a second end of said rotation axle rotatably supports said flywheel,
wherein continued cyclical rotation of said slidable elongated core provides continuous rotation to said flywheel which is connected to said generator thereby causing said generator to convert the rotational movement of said flywheel into electricity, and
wherein said generator is connected to said first battery via said conductor thereby allowing said first battery to store electricity crated by the generator.

3. The machine according to claim 1, wherein said slidable elongated core is rectangular or cylindrical in shape.

4. The machine according to claim 1, wherein said slidable elongated core includes a bottom cover and a slider guide plate that sandwich said reciprocating slider bar, and wherein said bottom cover and said slider guide plate are held together with nuts and bolts.

5. The machine according to claim 4, wherein slider rails are disposed between said bottom cover and said slider guide plate thereby allowing said reciprocating slider bar to move therebetween.

6. The machine according to claim 1, wherein said reciprocating slider bar is approximately four times as long as said slidable elongated core.

7. The machine according to claim 1, wherein said second end of said lever is either:
manually moved; or
moved by a mechanical switch operated by a power source, said mechanical switch being positioned at said second end of said lever, and said second switch being movable by a power source, whereby movement of said second end of said lever causes said lever to pivot thereby causing said first end of said lever to linearly move said slidable elongated core.

8. The machine according to claim 7, wherein said second end of said lever is moved by said mechanical switch; and said power source is a second battery.

9. The machine according to claim 8, wherein said second battery is rechargeable.

10. The machine according to claim 9, wherein said second battery is configured to be charged by a solar panel, a wind turbine or another power source.

* * * * *